(12) United States Patent
Jewkes et al.

(10) Patent No.: US 11,204,755 B2
(45) Date of Patent: Dec. 21, 2021

(54) SYSTEMS AND METHODS FOR PROVIDING EVENT ATTRIBUTION IN SOFTWARE APPLICATION

(71) Applicant: Split Software, Inc., Redwood City, CA (US)

(72) Inventors: Henry Jewkes, Denver, CO (US); Patricio Echagüe, Redwood City, CA (US); Trevor Stuart, San Mateo, CA (US); Andrew Greene, East Palo Alto, CA (US)

(73) Assignee: SPLIT SOFTWARE, INC., Redwood City, CA (US)

( * ) Notice: Subject to any disclaimer, the term of this patent is extended or adjusted under 35 U.S.C. 154(b) by 0 days.

(21) Appl. No.: 16/681,207

(22) Filed: Nov. 12, 2019

(65) Prior Publication Data
US 2020/0150949 A1    May 14, 2020

Related U.S. Application Data

(60) Provisional application No. 62/760,826, filed on Nov. 13, 2018.

(51) Int. Cl.
| | | |
|---|---|---|
| *G06F 9/44* | (2018.01) | |
| *G06F 8/65* | (2018.01) | |
| *G06F 17/18* | (2006.01) | |
| *G06F 11/34* | (2006.01) | |

(52) U.S. Cl.
CPC ............ *G06F 8/65* (2013.01); *G06F 11/3438* (2013.01); *G06F 17/18* (2013.01)

(58) Field of Classification Search
None
See application file for complete search history.

(56) References Cited

U.S. PATENT DOCUMENTS

| | | | |
|---|---|---|---|
| 9,229,902 B1* | 1/2016 | Leis | H04L 41/0866 |
| 2011/0088014 A1* | 4/2011 | Becker | G06F 11/3684 |
| | | | 717/125 |
| 2014/0157058 A1* | 6/2014 | Bennah | G06F 11/34 |
| | | | 714/38.1 |

(Continued)

*Primary Examiner* — Wei Y Zhen
*Assistant Examiner* — Lanny N Ung
(74) *Attorney, Agent, or Firm* — Womble Bond Dickinson (US) LLP

(57) ABSTRACT

A method and apparatus for event attribution during software experimentation is described. The method may include receiving, by a server computer system, a plurality of event tracking messages associated with an end user system, each event tracking message including at least a customer identifier, an end user identifier, and a timestamp. The method may also include storing each event tracking messages with the received customer identifier, end user identifier, and timestamp in a customer data store. Furthermore, the method may include applying, by the server computer system, a feature treatment to a configurable application executing on the end user system, the feature treatment specified by a customer system associated with the customer identifier, and the feature treatment configures one or more features of the configurable application associated with the end user identifier. The method may also include attributing a first set of events from the received plurality of event tracking messages with the application of the feature treatment.

15 Claims, 9 Drawing Sheets

(56) References Cited

U.S. PATENT DOCUMENTS

| | | | |
|---|---|---|---|
| 2015/0254158 A1* | 9/2015 | Puri | G06F 11/079 |
| | | | 714/37 |
| 2016/0292065 A1* | 10/2016 | Thangamani | H04L 41/064 |
| 2018/0337794 A1* | 11/2018 | Casaletto | H04L 43/0876 |

* cited by examiner

SYSTEMS AND METHODS FOR PROVIDING EVENT ATTRIBUTION IN SOFTWARE APPLICATION

PRIORITY

The present application is a non-provisional of, and claims the benefit of, U.S. Provisional Application No. 62/760,826, filed Nov. 13, 2018, which is incorporated by reference in its entirety.

TECHNICAL FIELD

Embodiments of the invention relate to the field of software application development and deployment, and more particularly, to providing attribution of events to application features.

BACKGROUND

Software applications, such as web page based applications, mobile device applications, desktop computer system applications, etc., are created by software developers. The software applications are then distributed to end users and run on end user computer systems (e.g., run on a user's personal computer, mobile computing device, served to a user from a web server, etc.). From usage of a software application, a developer may determine that changes to the application are necessary and/or desired for various reasons. For example, a software application may contain a bug causing the application to act in undesirable or unforeseen ways, and may even prevent the software application from running. As another example, a developer may want to change a user interface based on experiences and/or feedback of real world users of the application. As yet another example, a software application update intended to allow a real world user to improve service booking may appear to result in fewer service bookings. As yet another example, a new version of a web page may be intended to decrease page load time, when in fact it increases page load time. Thus, the effectiveness of the application in terms of operational performance and user experience may influence updates to the application.

Software applications, however, are becoming increasing complex in terms of the number and characteristic of user interface elements, user interface layout, functional elements, options that may be deployed in an application, as well as other facets that may impact user experience. Thus, measuring whether an update is effective in terms of operational performance and/or user experience is also increasingly difficult. Additionally, measuring effectiveness may involve systems other than the application itself. For example, an application may be intended to drive a user to submit a request to enter data in a customer relationship management system, which is not linked to the application, and thus it is not possible to relate events occurring in the application and the customer relationship management (and other) external systems.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
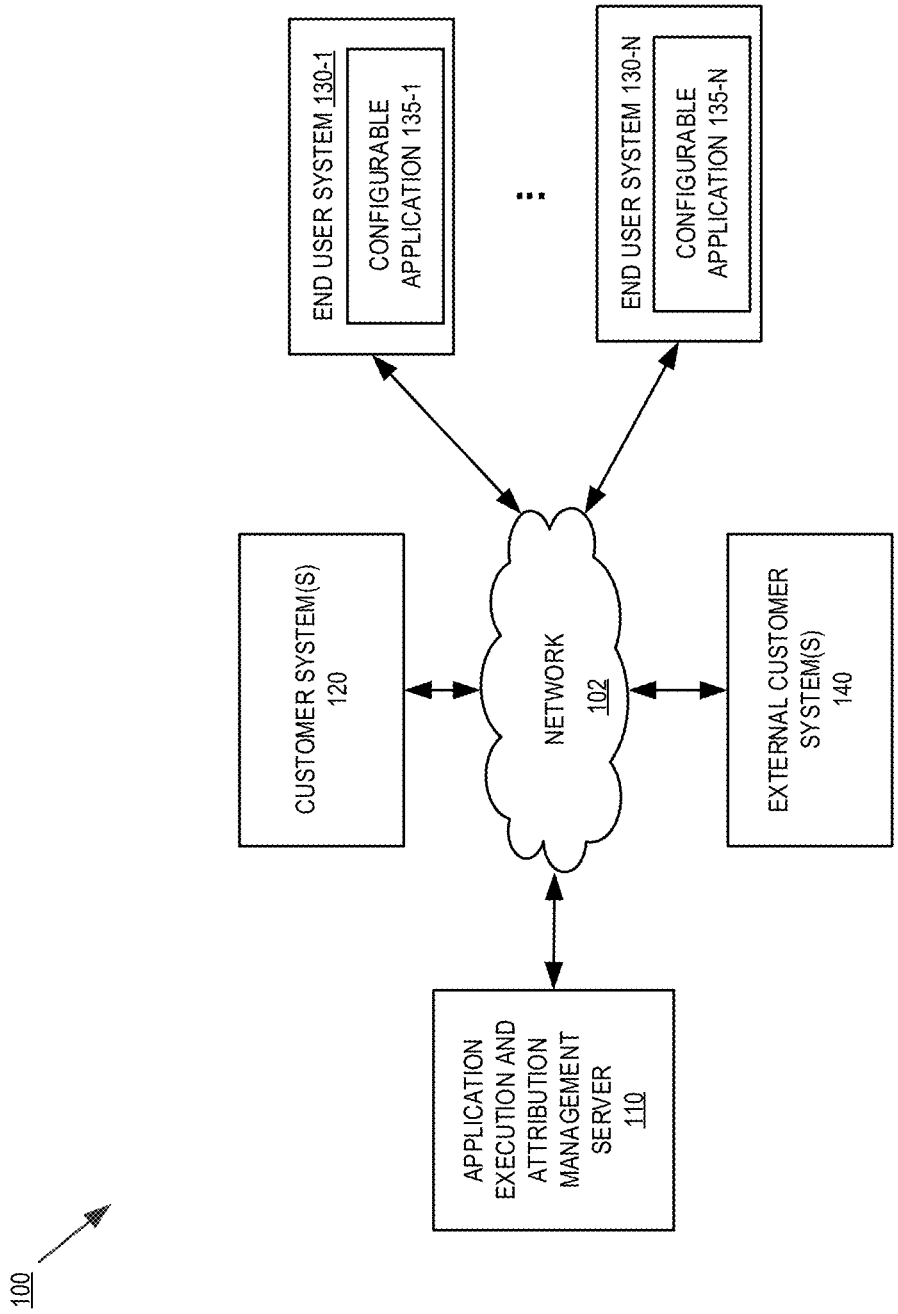
FIG. 1 is a block diagram of an exemplary system architecture for providing event attribution to feature treatments in configurable applications.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "storing", "providing", "accessing", "comparing", "detecting", "performing", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary system architecture 100 for providing event attribution to feature treatments in configurable applications.

In one embodiment, the system 100 includes a plurality of user systems, such as end user system 130-1 to user system 130-N, application execution and attribution management server 110, customer system(s) 120, and external customer system(s) 140. In one embodiment, end user system 130-1 to user system 130-N may be personal computing devices, such as a desktop computer, laptop computer, tablet computer, mobile computing device, mobile communication device, etc. The application execution management and attribution server 110, customer system(s) 120, and external customer system(s) 140 may also be computing devices, such as one or more server computers, desktop computers, etc.

The end user systems 130-1 through 130-N, application execution and attribution management server 110, customer system(s) 120, and external customer system(s) 140 may be coupled to a network 102 and communicate with one another using any of the standard protocols for the exchange of information. In embodiments, secure protocols for the exchange of information may also be used. In one embodiment, one or more of the end user systems 130-1 through 130-N, application execution and attribution management server 110, customer system(s) 120, and external customer system(s) 140 may run on one Local Area Network (LAN) and may be incorporated into the same physical or logical system, or different physical or logical systems. Alternatively, the end user systems 130-1 through 130-N, application execution and attribution management server 110, customer system(s) 120, and external customer system(s) 140 may reside on different LANs, wide area networks, cellular telephone networks, etc. that may be coupled together via the Internet but separated by firewalls, routers, and/or other network devices. In yet another configuration, the application execution and attribution management server 110, customer system(s) 120, and external customer system(s) 140 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, end user systems 130-1 through 130-N execute applications, such as configurable applications 135-1 through 135-N. The configurable applications may include any type of software application such as an application downloaded to, installed on, and run on a user system, a web based application downloaded from a server computer system and run on a user system, a mobile application where the user system is a mobile device, as well as other types of software applications. Configurable applications 135-1 through 135-N may be configured at run time using application execution and attribution management server 110 to control how one or more features are treated during execution of the application. For example, a feature may be turned on or turned off by application execution and attribution management server 110 for execution by one or more user systems 130-1 through 130-N, such as activation of a user interface element, activation of an application capability, etc. As another example, a value may be set by application execution and attribution management server 110 within an application that impacts how the application is executed by an end user system, such as specifying between different credit cards that can be accepted in a merchant user interface of the application. As yet another example, appearance of a user interface may be altered by application execution and attribution management server 110. In embodiments, the different real-time configurations of running applications are referred to herein as treatments, where a treatment configures one or more application features during the execution of software applications by end user systems. Furthermore, each of user systems 130-1 through 130-N may execute the same or different applications having the same and/or different treatments applied by application execution management server 110. For example, different subsets or populations of end user systems 130-1 through 130-N may have different treatments applied to their respective configurable applications 135-1 through 135-N during treatment efficacy experimentation, as discussed herein. For ease of discussion, and to avoid obscuring embodiments set forth herein, the remaining discussion will assume that the configurable applications 135-1 through 135-N are the same type of application even if they have different treatments being applied.

In one embodiment, configurable applications 135-1 through 135-N are prepared for management by application execution and attribution management server 110 by a developer of the application, such as by a developer associated with customer system(s) 120. In one embodiment, a user of customer system(s) 120 includes a feature treatment logic within each application 135-1 through 135-N. Optionally, a user of developer system 120 may configure the application to communicate with a software development kit (SDK) (not shown) that is either within each application 135-1 through 135-N or remotely located at, for example, customer system(s) 120, a web server (not shown) providing the application of developer system, etc. The SDK and documentation for inserting the feature treatment logic within the code of an application may be downloaded from application execution management and attribution server 110. In embodiments, the SDK is a software development tool responsible for communicating with application execution and attribution management server 110 on a periodic basis for acquiring definitions that enable the feature treatment logic with applications to select between configurable application features based on, for example, end user system identifiers, user identifiers, or other identifiers, and logic within the application's code for executing a feature specified in the acquired definitions. Customer system(s) 120 insert the feature treatment logic into the applications to enable runtime configuration of application features, such as the ability to selectively enable features, selectively change execution of features, selectively turn features on/off, selectively change a user interface and/or the elements contained therein, etc. One embodiment of providing for and configuring the execution of applications with different treatment(s), selectively and in real time using feature treatment logic, is described more fully in U.S. patent application Ser. No. 15/198,498, titled "Systems and Methods for Providing Control of Application Execution", file on Jun. 30, 2016, which is incorporated herein by reference in its entirety.

In embodiments, customer system(s) 120 may assign application(s) 135 and/or systems 130 with unique user identifiers, such as a user key. In embodiments, the user key(s) may be provided to application execution and attribution management server 110 from customer system(s) 120, so that customer system(s) 120 can specify how to identify specific end users and then which end users are to receive which treatments. Furthermore, the user key maintains the privacy of users of the customer, as private and/or personally identifying information is not shared with application execution and attribution management server 110.

In embodiments, customer systems 120 may provide user attributes that are associated with user keys, for example in a user data store (e.g., user data store 216), such as age, geographic region, gender, income bracket, etc. This enables customer systems(s) 120 the ability to test software features at end user systems 130-1 through 130-N on a select basis, for example by activating a feature on a specific user (e.g., by user key), a select group of user systems (e.g., subsets or populations of user's having a specific attribute or combination of attributes), to roll out a feature slowly over a set period of time to select user groups, to turn off features that are not behaving as expected, etc.

In one embodiment, customer system(s) 120 further insert event tracking method calls in one or more of configurable applications 135-1 through 135-N. In embodiments, the event tracking method calls may also be inserted into software executing on customer system(s) 120 and/or external customer system(s) 140, such as systems providing web based services software, customer resource management software systems, remote data warehouses, enterprise resource planning software systems, active policy management software systems, security information and event management software systems, and/or other software systems used by customer system(s) 120 that provide software and/or services to end user system(s) 130-1 through 130-N. In embodiments, the method calls are provided by an application programming interface (API) distributed by application execution and attribution management server 110, which may be inserted into and executed by software applications 135-1 through 135-N, as well as applications executed by customer systems(s) 120 and external customer system(s) 140.

In one embodiment, event tracking method calls, when made, generate a message that includes at least a customer key (e.g., a customer identifier) that enables application execution and attribution management server 110 to distinguish between different customers (e.g., corporation X and corporation Y), a user key (e.g., a traffic type that identifies one or more users and/or characteristics of users of the customer, such as specific user IDs, class of user, a type of account associated with the user, etc.), an event type that identifies the event being tracked, a value associated with a metric for the event (e.g., time on page, occurrence or non-occurrence of a booking, occurrence or non-occurrence of a sale, number of interactions with a feature, etc.), and a timestamp indicative of when the event triggering the method call occurred. For example, the event tracking method call may be triggered in response to a user clicking a buy button on a web based application, a booking is initiated in a mobile app, a user selects a credit card in an application, etc. (e.g., active events with respect to a user interacting with an application), and may also be triggered when a user leaves a specific page of an application or web application, time a frame in an application or web page is displayed, a method call in response to completion of a specific event (e.g., page load time), passive events with respect to a user's interactions with an application, where the track method call is included in the code for the application feature being tracked. In embodiments, the method call within the application generates a message including the above described information, and is transmitted to application execution and attribution management server 110. In one embodiment, the message may be encrypted or otherwise secured to obfuscate the information contained herein. However, as discussed herein, the identifiers do not reveal personal user information, and are instead used by customer system 120 to associate with the customer's users.

One embodiment of the track events method call, may be a method call, such as track( ) defined in an SDK or API distributed by application execution and attribution management server 110 and integrated into configurable applications 135-1 through 135-N, which may take four arguments. For example, the track( ) method call may be able to pass to application execution and attribution management server 110 a customer_ID (e.g., an identifier that represents the customer system, such as customer system(s) 120 that distributed configurable applications to end user systems), a traffic_type (e.g., a string that represents an end user system and enables customer system(s) 120 to identify specific users, groups of users, etc., such as a user ID, account ID, customer type including fee or paid, etc.), an event_type (e.g., a string that represents an event type corresponding to the event that resulted in the track( ) method call), and value (e.g., an optional value that may be defined to represent a value or metric to be tracked, or which can be set to null or zero in the event application execution and attribution management server are to count occurrences of an event). Furthermore, the execution of the track( ) method call may also generate and attach a timestamp to the event message. For example, a track( )method call may take the form of client.track("Customer_ID", "Trafic_Type", "Event_Type", Value), with example values of client.track ("john@doe.com", "user", "page_load_time", 83.3334). In embodiments, however, other fields/arguments may be used consistent with the discussion herein for tracking and describing events that occur in response to application of different application treatments.

In embodiments, when event tracking method calls are integrated into features of configurable application(s) 135-1 through 135-N, software running in customer system(s) 120, and/or software running in external customer system(s) 140, application execution and attribution management server 110 aggregates a plurality of received event messages, and stores the event messages in a data store (not illustrated) by customer key, user key, or any other key, along with the data (e.g. timestamps and other data) from the event messages that enable application execution and attribution management server 110 to store, locate, and sort event information records. In embodiments, the event messages may be generated from method calls embedded in feature treatments that have been activated in a configurable application. However, event messages may also be generated from method calls in other software components or systems. For example, an event tracking message may be used within a feature's selected treatment to indicate when the user is accessing the treatment or a function within a treatment. As another example, a feature treatment may be designed to improve sales conversions, and the method call is associated with a buy button that is not part of the configurable aspects of the application. As yet another example, an external customer system 140, such as a customer relationship management (CRM) system, may use a track event method call when a new contact is added to the CRM system. As discussed herein, even though one or more of the received event messages are not connected to the execution of the configurable application, they may be relevant to customer system 120 when determining effectiveness of a treatment. Therefore, the use of the track( ) method calls discussed herein enables the tracking and attribution of events from a more diverse set of systems to improve how relevant events are attributed to feature treatment application at one or more of end user systems 130.

In embodiments, events may be tracked which are not directly part of a configurable feature treatment, and may even be in an unrelated (e.g. remote system) software system (e.g., customer system(s) 120, external customer system(s) 140, or other systems). However, in embodiments, each of the tracked events regardless of where the even message originates (e.g., accessing a treatment, buy button selection, CRM system contact added, as well as other tracked events) may be defined as having a value associated with a metric for measuring the effectiveness of an application. The metrics, and values associated with the metrics, may be defined by a customer system 120 (e.g., via user interface provided by application execution and attribution management server 110), and appropriate track( ) method calls placed within the other software systems reporting the value of the metric during application of feature treatment(s).

In one embodiment, after aggregating the plurality of events from the various systems from the received event tracking messages, application execution and attribution management server 110 performs event attribution on the collected corpus of reported events from end user systems(s) 130-1 through 130-N and other software systems that have integrated the tracking techniques discussed herein. In embodiments, event attribution links events (e.g., from event messages from any source system) with feature treatments applied in a configurable application. The link is established by the application execution and attribution management server 110 using one or more of the customer key and/or user key, and time stamps in the event messages based on a time when a feature treatment is activated. That is, events (e.g., clicks, views, buys, etc.) that occur after a user (e.g., an end user of one of end-user systems 130) received a treatment for a configurable application may be linked/attributed to the feature treatment. Furthermore, because feature treatments may be organized based on any number of end user attributes (e.g., one or more of age, geography, income bracket, user class, gender, profession, etc.), different sample sets or populations may be generated for deploying different feature treatments in different time periods. The attribution of events to feature treatments, and further based on sample sets, are then used by application execution and attribution management server 110 to determine, using statistical measures of significance, whether an event was influenced by a feature treatment based on the values and event types within the event messages from the different populations/subsets of end users. For example, activating a variant of feature treatment x resulted in a statistically higher sales conversion for users belonging to group y. As another example, activating a variant of feature treatment i resulted in a statistically longer page view time for users belonging to group j. As yet another example, an event triggered on an external system 140 is statistically more likely to happen for users in group a exposed to feature treatment b.

Figure 4:
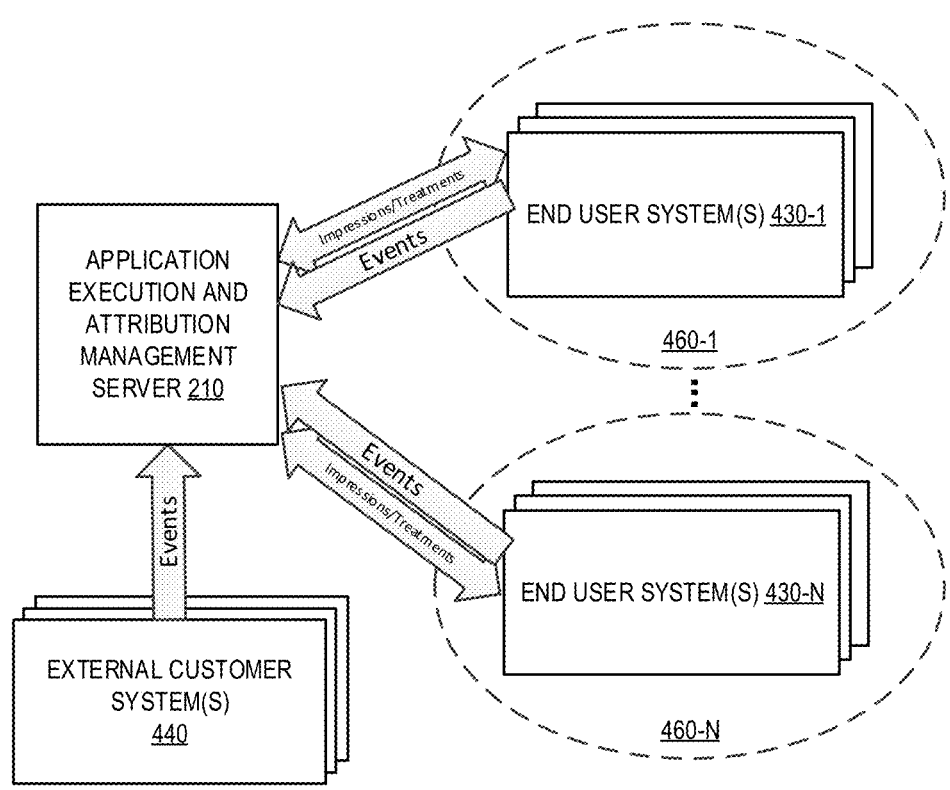
FIG. 4 is a block diagram of an exemplary system architecture for experimental group event attribution and application treatment control.

For example, FIG. 4 illustrates end user system(s) 430-1 as part of sample set 460-1, which may receive for example, a first version of feature treatment or a first version of treatments to more than one feature. End user system(s) 430-N are part of sample set 460-N, which may receive a second version of feature treatment or a second version of treatments to more than one feature. The sample sets may be defined, by a customer system (not shown) and/or the application execution and attribution management server (e.g., system 210), based on any combination of end user characteristic. The application execution and attribution management server 210 may then distribute the same or different treatments to the end user systems 430 and receive event messages, as well as event messages from end user systems and external customer system(s) 440. These event messages, when attributed to the application of feature treatment to the different groups, may then be used to determine whether the treatments were influential in reaching a goal of customer system 120 (e.g., by statistically analyzing one or more metrics collected from relevant event messages). For example, was a treatment statistically significant in a sales event (e.g., clicking a buy button, adding a contact to a CRM system, etc.), page time event (e.g., a time on page measurement, page load time reduction, etc.), etc. Furthermore, application execution and attribution management server 210 may adjust and/or re-define the sample sets based on customer instructions and/or automatically to execute orchestrated experiments, feature rollout, user system randomization for sample sets, etc.

Returning to FIG. 1, in one embodiment, the statistical significance of events attributed to feature treatments, and further based on user sample sets, may be used to generate a user interface to a user of customer system 120. In embodiments, statistical significance represents the likelihood that the difference in a metric between selected treatments and a baseline or control treatment is not due to chance (e.g., the treatment influence a metric value's change). Statistical significant of a treatment on a metric's value (e.g., a metric of importance to a customer system) may be determined using standard statistical analysis techniques, such as frequentist testing techniques, Bayesian testing techniques, resampling techniques, as well as other statistical analysis techniques, and a threshold of statistical significance may be defined by a customer system (e.g., 5%, 10%, 2%, 0.1%, etc.). This threshold enables a customer to adjust the risk associated with falsely attributing statistical significant to a result of an experiment (e.g., treatment application).

In one embodiment, because events include customer defined values and event types, the values and event types are typically associated with key performance measurements of the customer (e.g., sales conversions, service bookings, time on page, page load times, etc.). Therefore, the statistical evaluation of the event values for the relevant event types, which is based on the attribution performed by application execution and attribution management server 110, enables application execution and attribution management server 110 to generate reports that indicate the effectiveness of an application's treatment variations with respect to those key performance measurements. In one embodiment, the reports are generated in a web based user interface provided to a customer system 120 so that a user of customer system 120 can view and analyze the effectiveness of different feature treatments with respect to their key performance measurements. Beneficially, the reports are able to collect events from any number of configurable applications and remote systems which may be relevant to the customer system. Thus, a more complete picture of application effectiveness can be generated based on application of feature treatments for all end user systems and subsets of end user systems. Customer system(s) may use the information to determine which versions (e.g., which treatment or collection of treatments) to roll out in an update, which treatments are to be applied to which user groups, etc. to maximize application effectiveness with respect to achieving the key performance measurements determined through event attribution.

In one embodiment, the statistical significance of attributed events to feature treatments may also be used by application execution and attribution management server 110 to actively configure additional end user systems. That is, when application execution and attribution management server 110 detects that a feature treatment is statistically likely to achieve a customer system 120 defined goal (e.g., statistically significant increase in sales, increase in subscription sign ups, page views, decreased page load time, etc.), in embodiments, application execution and attribution management server 110 can proactively apply the feature treatment determined to have the statistically significant impact to the end user system or systems that are determined to be influenced by the feature treatment. For example, the specific treatment may be applied to all end user systems 130-1 through 130-N, or a subset of user systems chosen based on the statistical significant analysis. Therefore, real time testing and analysis enables application execution and attribution management server 110 to tune the configurable applications in end user systems in a way that is most beneficial to customer system(s) 120. However, in embodiments, the reports generated for customer may include the recommended tuning.

Figure 2:
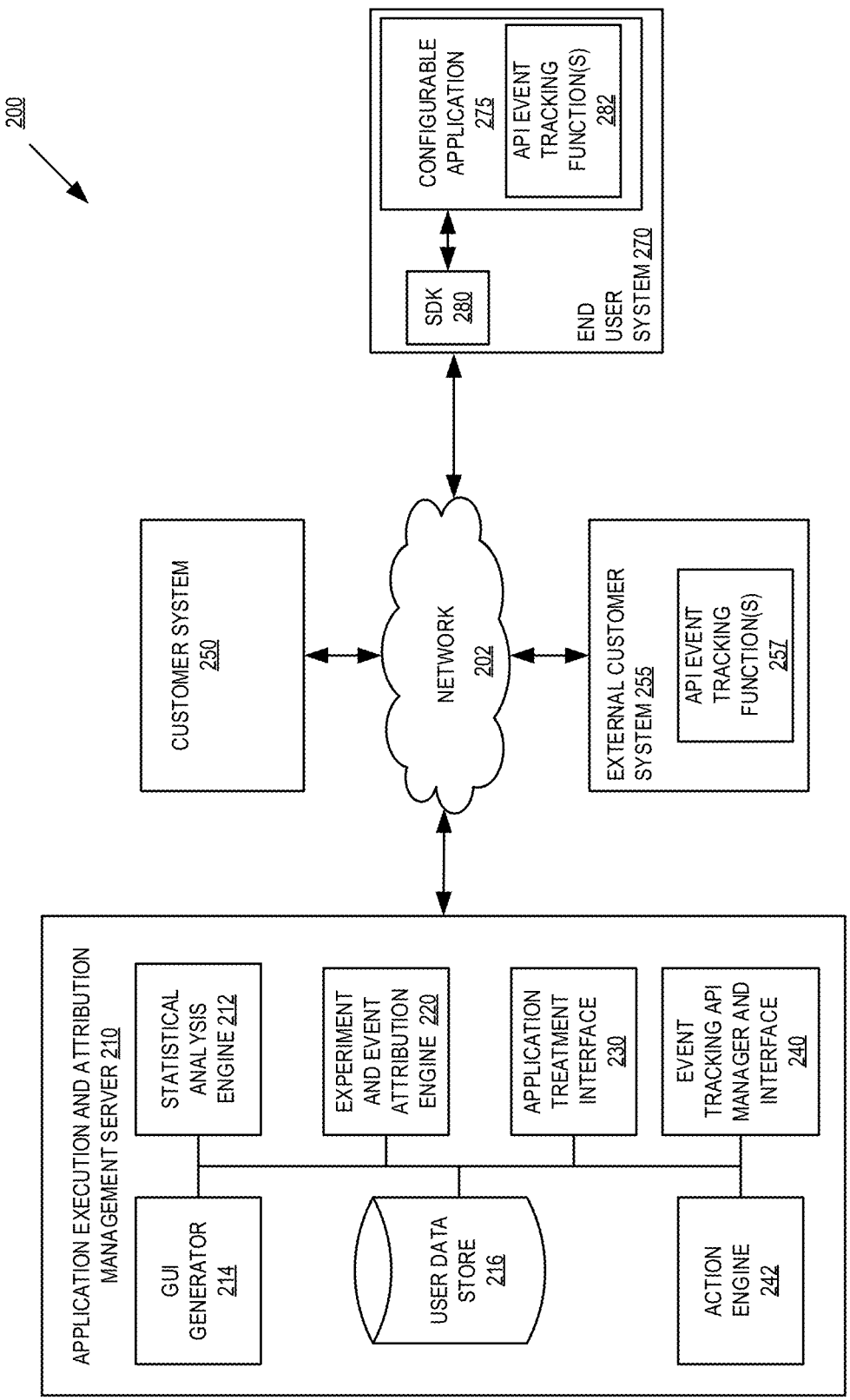
FIG. 2 is a block diagram of one embodiment of an application execution and attribution management server, one or more customer system(s), one or more external system(s), and an end user system.

FIG. 2 is a block diagram of one embodiment 200 of an application execution and attribution management server 210, an end user system 270, a customer system 250, and an external customer system 255. The systems illustrated in FIG. 2 provide additional details for the systems discussed above in FIG. 1. Furthermore, although there is only one customer system 250, one external customer system 255, and one end user system 270, any number of such systems may be used for even attribution and analysis as discussed herein.

In one embodiment, application execution management and attribution server 210 includes a statistical analysis engine 212 for performing statistical analysis on events that have been attributed to feature treatments for users/user groups, graphical user interface (GUI) generator 214 for displaying configuration interfaces to customer system 250 as well as statistical analysis results, user data store 216 for storing events with associated event data and treatments/impressions data, experiment and event attribution engine 220 to define one or more user groups for receiving treatment variations and for attributing event messages from both end user systems and external systems to those treatment variations, application treatment interface 230 for distributing treatment configurations to end user system 270 as specified by customer system 250 or based on an orchestrated experiment, event tracking API manager and interface 240 to distribute event tracking method call APIs and receive event messages for storage of the event messages and event message data in user data store 216, and action engine 242 to, which in embodiments, proactively applies one or more feature treatments based on determined statistical significance of a feature treatment to user groups.

End user system 270 includes a configurable application 275 capable of receiving feature treatment configuration data and selectively applying feature treatments, an optional software development kit (SDK) 280 for receiving the feature treatments, and API event tracking functions 280 such as event tracking method calls (discussed above) defined by an API of application execution and attribution management server 210. In embodiments, the method calls in API event tracking functions 282 may or may not be part of a configurable feature within application, as defined by a developer associated with customer system 250 includes the method calls within the application.

External customer system 255, such as a data warehouse, CRM system, policy system, etc. may also include API event tracking functions 280 that a developer has associated with customer system 250 and has included the method calls for generating event messages within the application being executed at external customer system 255.

Customer system 250, in embodiments, distributes the configurable application 275 to end user system 270 directly, or through a third party (not shown) such as an application store. Furthermore, after configurable applications are distributed to end user systems, a user of customer system 250 may define, using application identifiers, customer keys, user keys, etc. which treatments are to be applied to which features in configurable application 275. Furthermore, a user of customer system 250 may specify an experiment (e.g., define user groups and associated treatments, a timeframe for an experiment including start time and duration, etc.), set up an orchestrated experiment (e.g., timed rollout of a feature to members of a user group or user class), and define automatic actions that action engine 242 may take based on statistical analysis results.

In one embodiment, event tracking API manager and interface 240 of application execution and attribution management server 210 receives event messages on an ongoing basis, and stores the relevant data (e.g., customer key, user key, event type, value, timestamp, etc.) in user data store 216. Then, based on experiment parameters defined by customer system 250, application treatment interface 230 may distribute feature treatments to associated user(s)/group(s) (e.g., users in a specific region have a specific treatment applied, users of a certain age have a specific treatment applied, etc.), and collects event messages. Experiment and event attribution engine 220 then accesses the user data store to obtain event message data associated with the customer key and user key (e.g., event messages associated with customer system 250, and the end users of that customer including end user system 270).

As discussed below, experiment and event attribution engine 220 may perform event attribution for some events, exclude some users from an experiment, update a version of an experiment, and set a window of time for the experiment (e.g., automatically or based on customer system input). As discussed herein, application execution and attribution management server 210 is able to consume event data from any source (e.g., one or more end user systems, external customer systems, etc.) so long as the event captured in an event message can be associated with a customer key, traffic/user key, and timestamp. Thus, application execution and attribution management server 210 allows customer systems and configurable applications to send application execution and attribution management server 210 data from any source, for automatically identifying the sample population of an experiment, and using experiment and event attribution engine 220 to intelligently attribute events to each sample based on targeting rule (e.g., how a user is identified for a treatment) and treatment (e.g., application of the treat to the identified user).

In embodiments, experiment and event attribution engine 220 combines received event data with the user keys to determine whether the event may have been influenced by a treatment applied to configurable application 275, based on whether the event occurred after the end user system was exposed to the treatment. Furthermore, the event messages, as discussed herein, may include a value associated with an event type that is relevant to a metric for the event type (e.g., an impact of a particular treatment) compared to a baseline treatment (e.g., values from event messages from another subset of users, for example, those without the treatment applied or a different treatment applied).

In the embodiments discussed herein, the processes of mapping generated event messages to the experiments and treatments users were exposed to is referred to as attribution, and is a cornerstone to determining significance of the statistical significance of treatments. Attribution, in embodiments, can be divided up into three scenarios In most scenarios, when a user is shown a treatment, their treatment will not change for the duration of the experiment or until the version of the experiment changes. In embodiments, the user (e.g., of end user system 270) is the target of the treatment experimentation, and thus a rule may be received from customer system 250 that defines how the user is identified during an experiment (e.g., a rule defining a user characteristic, a user group, etc. and what treatment variation is to be applied).

In embodiments, experiment and event attribution engine 220 identifies when the user first saw the treatment, and attributes all events within a time period (e.g., a threshold, such as 1 minute, 15 minutes, 1 hour, etc.) prior to this first impression. In embodiments, this time period acts as a buffer to account for, for example, different system clocks on systems that are part of an experiment, treatment applications to different systems are captured in sync, etc. If an event timestamp is older than the time period before the impressions timestamp, experiment and event attribution engine 220 would not attribute the event to the experiment and treatment on the metric's impact. This same logic is applied by experiment and event attribution engine 220 to the end of an experiment. There is another time period buffer for events to be received once the version changes before the final calculation is done and the metric's impact are frozen for that version of the experiment.

Figure 3A:
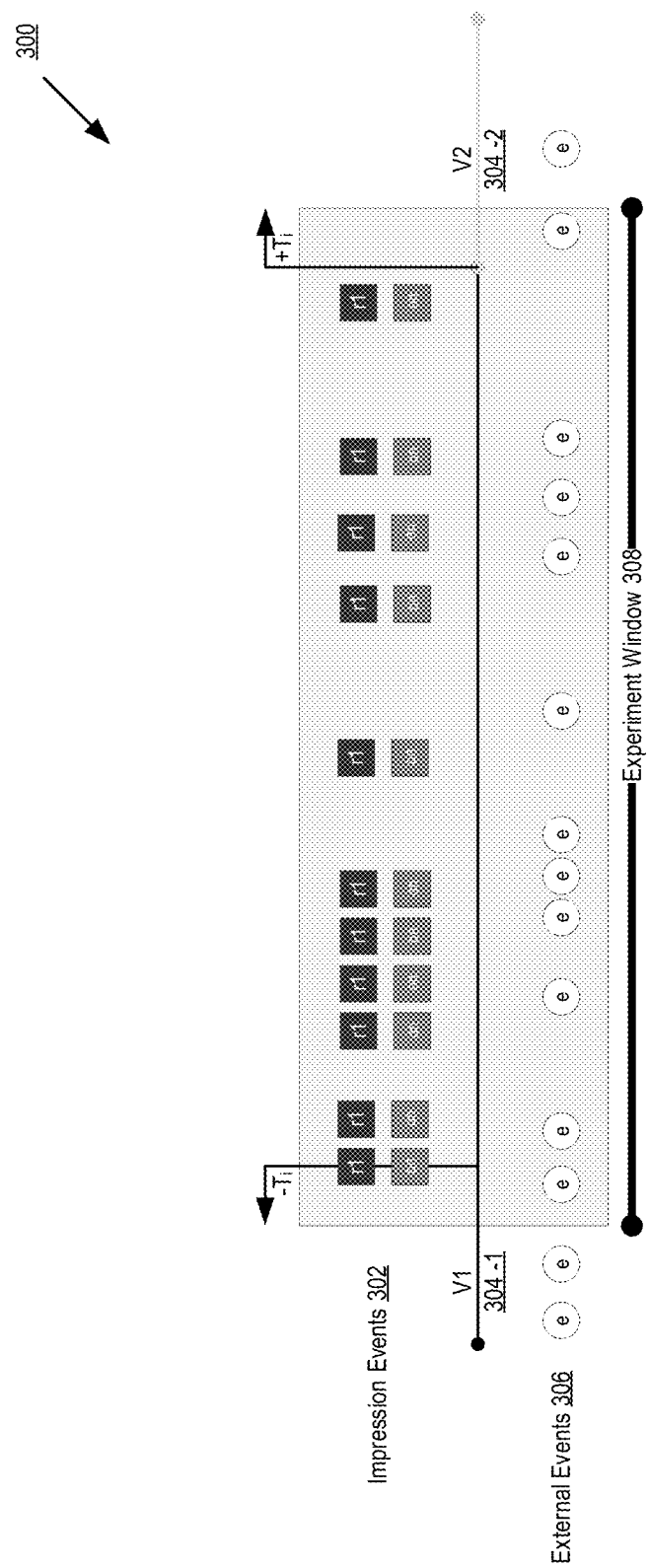
FIGS. 3A-3C illustrates events associated with configurable application treatment application for attribution.

FIG. 3A is a diagram that illustrates an embodiment 300 of attribution by experiment and event attribution engine 220 following a single user's activity. This example illustrates how experiment and event attribution engine 220 attributes events generated during an experiment when a user's rule (e.g., a user characteristic, classification, etc.) and treatment do not change throughout the experiment window 308 (e.g., the duration of the experiment from a specified start time including the time buffers).

As illustrated, external events 306 are denoted by 'e', and external events outside of experiment's window are illustrated with diagonal lines. For example, "e" is an event, such as a click event that is tracked via method call. "r1" and "on" are impression events 302 and are a representation of an end user's impressions (e.g., accessing a treatment) containing the rule (r1) and the treatment (on). At these points (e.g., each external event and each impression event), experiment and event attribution engine 220 is deciding whether the user and their actions are bucketed into a certain treatment based on the targeting rule that customer system 250 has defined (e.g., whether the user's action can be attributed to the application of the feature treatment during an experiment). In the illustrated example, all impression events in the timeline are for the same treatment and targeting rule.

The example in the timeline diagram illustrated in FIG. 3A shows the user's activity in configurable application 275 associated with customer system 250. When experiment and event attribution engine 220 calculates metrics, experiment and event attribution engine 220 includes the impression events 302 and external events 306 in the shaded region, e.g., the events from time buffer duration $T_i$ minutes before the user's first impression to time buffer duration $T_i$ minutes after the end of the version v1 304-1. Those events outside of the shaded area would not be included in the experiment window and/or used for determining statistical significant of user actions on a metric's value measured during the experiment. Any number of users' activities may be captured when a rule and treatment does not change during an experiment, as discussed above. Furthermore, additional experiment versions, such as version v2 304-2 may then be run and event messages attributed to that experiment, as discussed herein.

Figure 3B:
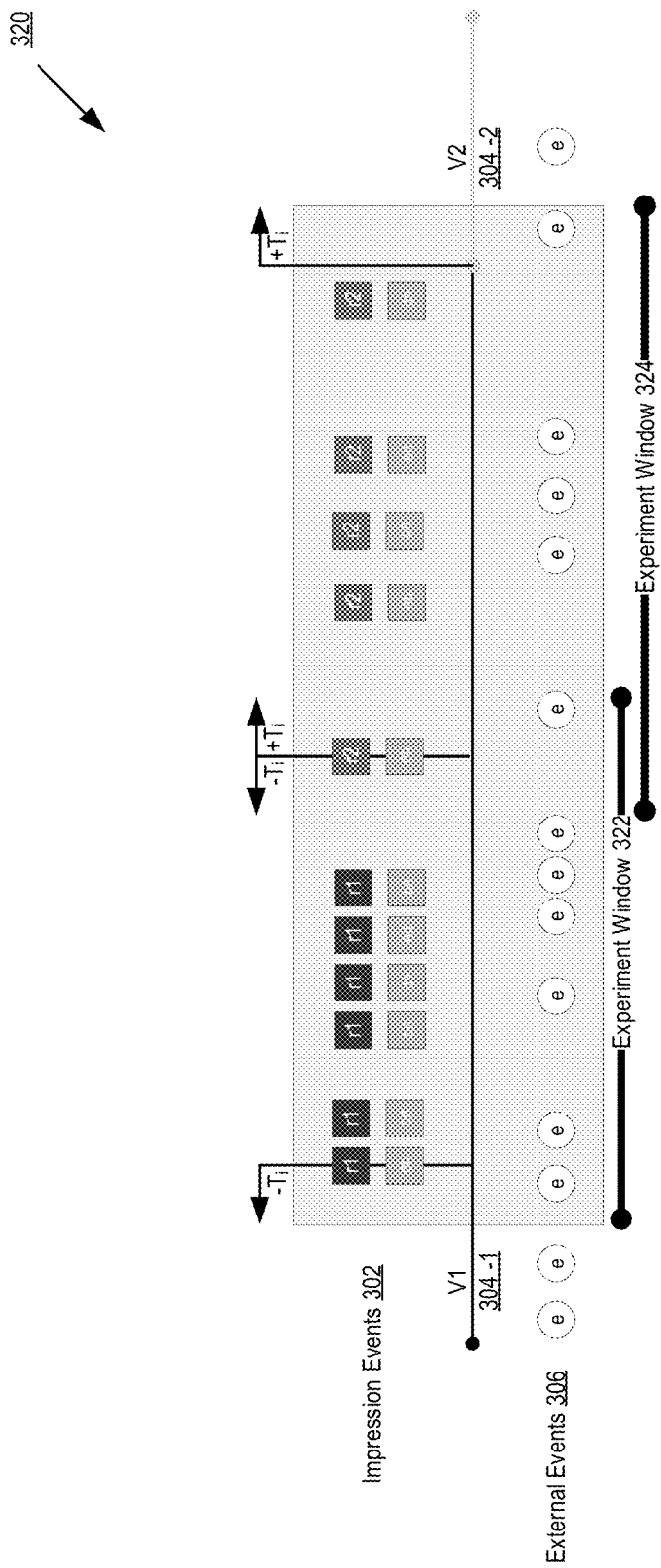

FIG. 3B is a diagram that illustrates another embodiment 320 of attribution by experiment and event attribution engine 220 following a single user's activity. The embodiment 320 illustrated in FIG. 3B illustrates attribution when a rule change occurs during an experiment, but there is no treatment change.

In some scenarios, when a user is shown a treatment the reason, or rule, that was used to determine the treatment may have changed. As an example, it is possible the attribute being used in the evaluation changed and the user still received the same treatment, despite their attribute changing.

In this case, experiment and event attribution engine 220 will isolate the events and apply a time period (e.g., 15-minute) buffer to the first and last impression received for the unique rule and treatment combination. For example, the treatment may remain "on" even though a user's subscription status changes (e.g., rule may be defined based on subscription status). FIG. 3B illustrates how experiment and event attribution engine 220 attributes events when a user's rule changes and their treatment does not change throughout the version. Again, "e" is an event, such as a click event. These events are represented within the timeline of the version of the experiment. "r1", "r2" and "on" illustrated in FIG. 3B are a representation of the user's impression events 302 and external events 306 containing the rule (r1 or r2) and the treatment (on). At these points, experiment and event attribution engine 220 is deciding whether the user's activities are bucketed into a certain treatment based on the targeting rule defined by customer system 250. In the above example, there are two unique combinations where the rule changes from r1 to r2 while the treatment remains the same. The example in the timeline diagram illustrated in FIG. 3B shows the user's activity in configurable application 275. When calculating metrics, experiment and event attribution engine 220 will include the shaded region when looking at targeting rule r1. Namely, experiment and event attribution engine 220 uses the events from a duration before (e.g., $T_i$ before) the user's first impression to a duration after (e.g., $T_i$ after) the first impression for the second rule for experiment window 322. When isolating to r2, the same rules apply. Experiment and event attribution engine 220 includes the events a duration before (e.g., $T_i$ before) the user's first impression for r2 to a duration after (e.g., $T_i$ after) the rule (in this example, version) change for experiment window 324. Those events not in the shaded region would again not be included in any rule analysis given they fall outside the buffer windows.

Figure 3C:
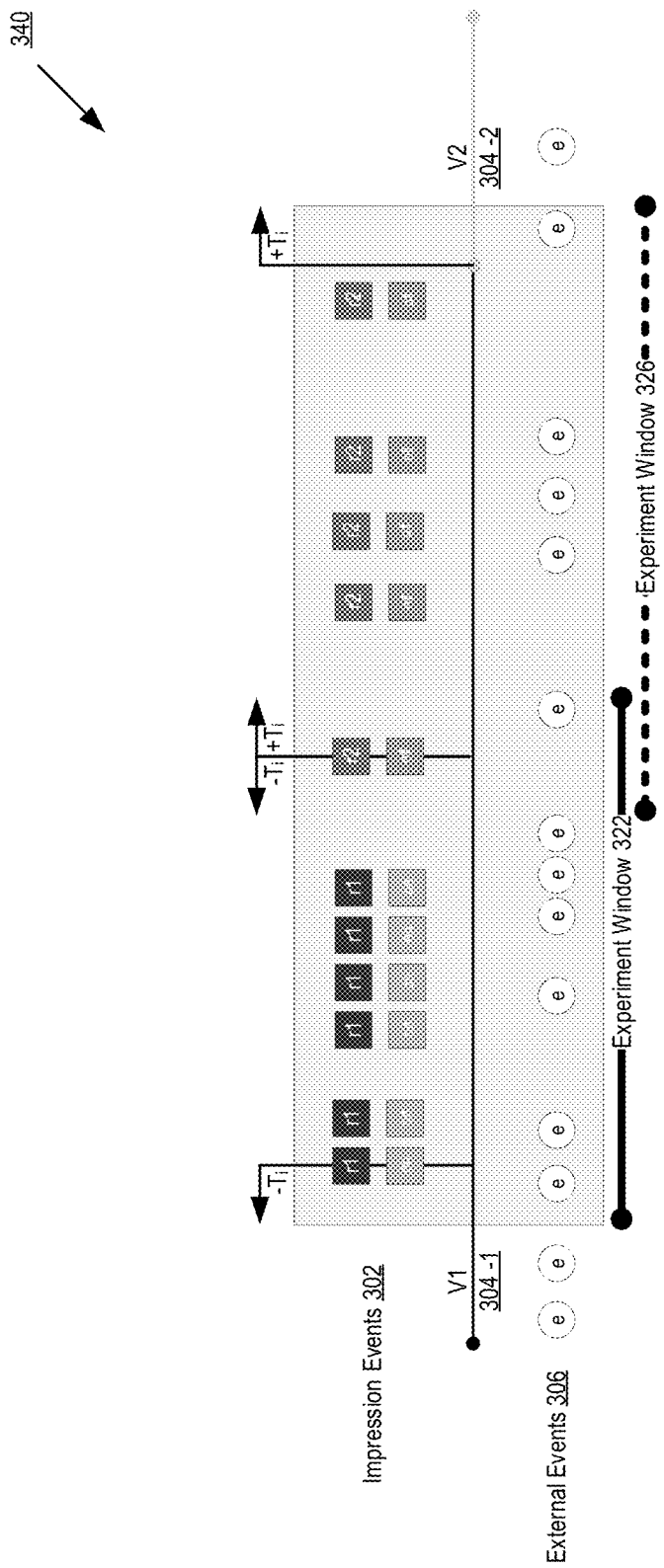

FIG. 3C illustrates another embodiment 340 of attribution by experiment and event attribution engine 220 following a single user's activity. The embodiment 340 illustrated in FIG. 3C illustrates attribution when there is a rule and treatment change during an experiment.

In some scenarios, the reason, or rule, that was used to determine the treatment may have changed, as well as the treatment itself, during an experiment. As an example, it is possible the attribute being used in the evaluation changed, and the user receives a new treatment as a result of their attribute changing. An example to illustrate this scenario is when the attribute customer system 250 seeks to target causes the targeted end user's treatment to change. For example, customer system 250 may target free end users (using the user attribute "free"), which is converted to paid and may show the users a prompt to take a certain action (treatment "on"). Once the end user system converts, the customer attribute now becomes "paid", and they no longer meet the targeting condition used to show them the prompt and are shown the "off" treatment in a different rule.

In this case, experiment and event attribution engine 220 will isolate the events and apply a buffer (e.g., $T_i$) to the version start and the unique rule treatment combination change. FIG. 3B illustrates how experiment and event attribution engine 220 attributes events when a user's rule changes and their treatment changes throughout the version. Again, "e" is an event, such as a click event. "r1", "r2" and "on", "off" are a representation of the user's impressions containing the rule (r1 or r2) and the treatment (on or off). At these points, experiment and event attribution engine 220 is deciding whether the user is bucketed into a certain treatment based on the targeting rule defined by customer system 250. In this example, there are two unique combinations where the rule is changing from r1 to r2 and the treatment changing from on to off.

The example in the timeline diagram of FIG. 3C shows the end user's activity in configurable application 275. When calculating metrics, experiment and event attribution engine 220 will include the shaded region when looking at targeting rule r1 for the events from a duration before (e.g., $T_i$ before) the user's first impression to a duration after (e.g., $T_i$ after) the first impression for the second rule for experiment window 322. When isolating to r2, the same applies and experiment and event attribution engine 220 includes the events the duration before and after the rule (in this example, version) change for experiment window 326. Those events outside the shaded region would not be included in any rule analysis given they fall outside the buffer windows.

Returning to FIG. 2, in embodiments, a user may be excluded by experiment and event attribution engine 220 from the aggregated results for an experiment (e.g., application of treatments to specific users, and analysis of the statistical significance of the treatment application to different subsets or sample populations during an experiment). In embodiments, exclusion of a user from an experiment excludes that user and their tracked events from the experiment, attribution, and statistical significance analysis discussed herein. Therefore, it is important when understanding attribution to also understand what causes a user and their tracked events to be excluded from the analysis of an experiment. In embodiments, there are two primary scenarios when experiment and event attribution engine 220 will automatically remove the user from the analysis. First, a user may be excluded due to treatment change within a rule. If a user is exposed to multiple treatments within a targeting rule, experiment and event attribution engine 220 will disqualify the user from the experiment and exclude their data when looking at metrics. In this case, for example, the user's data would be applied to both sides of the experiment, in both treatments, and will cloud metrics analysis results. For example, in a medical experiment, if a patient participating in a new drug trial was to switch to sugar pills halfway through the experiment, it would be inappropriate to ascribe their outcomes to either the group taking the drug or the group assigned the placebo. Thus, experiment and event attribution engine 220 will excluded users where a treatment changes within a rule, which could happen for multiple reasons. For example, if a user is moved from a treatment segment that is "whitelisted on" to a segment that is "whitelist off", their targeting rule "whitelisted segment" will not change, but their treatment may. As another example, if customer system 250 is using matching and bucketing keys, the bucketing key could change causing the same user (represented by the matching key) to receive a different treatment.

Furthermore, experiment and event attribution engine 220 may exclude a user from metric analysis for an experiment due to moving rules more than once. In one embodiment, experiment and event attribution engine 220 allows users to move between rules and treatments once within the same version of an experiment. However, if a user is frequently moving between versions and treatments, there may be an issue with the experiment and how targeting rules are applied to users. To be safe, and not to provide potentially bad data, experiment and event attribution engine 220 may cautiously remove the user and their data from the analysis performed by statistical analysis engine 212.

In embodiments, experiment and event attribution engine 220 and the analysis performed by statistical analysis engine 212 may support experiment version changes. When performing an experiment defined by customer system 250 (e.g., start time, rule application, targeting customer groups, etc.), it may be the case that users are progressively added into the treatment throughout the course of the experiment as customer system 250 edits targeting rules. In embodiments, changes to targeting rules will trigger a new version in experiment and event attribution engine 220. By tracking version changes, experiment and event attribution engine 220 is able to count only the events relevant to a particular treatment, and statistical analysis engine 212 may then treat each targeting rule as a distinct sample population to compare. As the version is changed, experiment and event attribution engine 220 runs a final calculate job a certain time period (e.g., 15-minutes) after the version change and freezes the metrics impact so customer system 250 can always revisit the results later.

Furthermore, experiment and event attribution engine 220 can manage experiment windows (e.g., timeframe). In embodiments, experiment and event attribution engine 220 allows customer system 250 to run an experiment across a customer specified window up to a maximum duration, for example up to a 90-day experiment time window. If an experiment's version is longer than the maximum duration, say 95 days, experiment and event attribution engine 220 may calculate data for the last number of days or duration of the experiment associated with the maximum duration.

In embodiments, based on the attribution and exclusion discussed above, experiment and event attribution engine 220 stores the attribution of events to treatments in user data store 216 for experiments. Statistical analysis engine 212 may access the data store, for example upon request of customer system 250, to perform one or more forms of statistical analysis, such as frequentist testing techniques, Bayesian testing techniques, resampling techniques, as well as other statistical analysis techniques. As discussed herein, the statistical analysis determines whether a treatment variation applied to a specific user and/or user group influence outcome with respect to values related to key performance measurements in event messages.

Furthermore, and as discussed herein, action engine 242 may also utilize the statistical analysis and one or more automatic action rules to automatically adjust configurations of configurable applications at end user's systems (e.g., end user system 270). The adjustments, when made, may be done to improve one or more of the functional performance of the application (e.g., increase application execution speed, reduce memory usage, etc.), a key performance measurement associated with the application (e.g., sales conversions, new sign ups, bookings, etc.), as well as other aspects of the application. In embodiments, a rule with which action engine 242 automatically configures an application with a treatment based on statistical significant determination is defined by customer system 250, such as via a graphical user interface to action engine 242 generated by GUI generator 214. In embodiments, the rule may be defined based on customer type, rule, statistical significance, confidence of statistical significance, or a combination of factors. In any event, upon the conclusion of one or more experiments, action engine 242 may request statistical analysis engine 212 to perform an analysis of a treatments' impact on a metric value, and when such value is determined to be statistically significant for a population defined in a rule, action engine may proactively configure treatments applied to one or more remote end user systems. As a result, the execution and performance by the remote end user systems is improved with respect to the goals of the customer system 250.

Figure 5A:
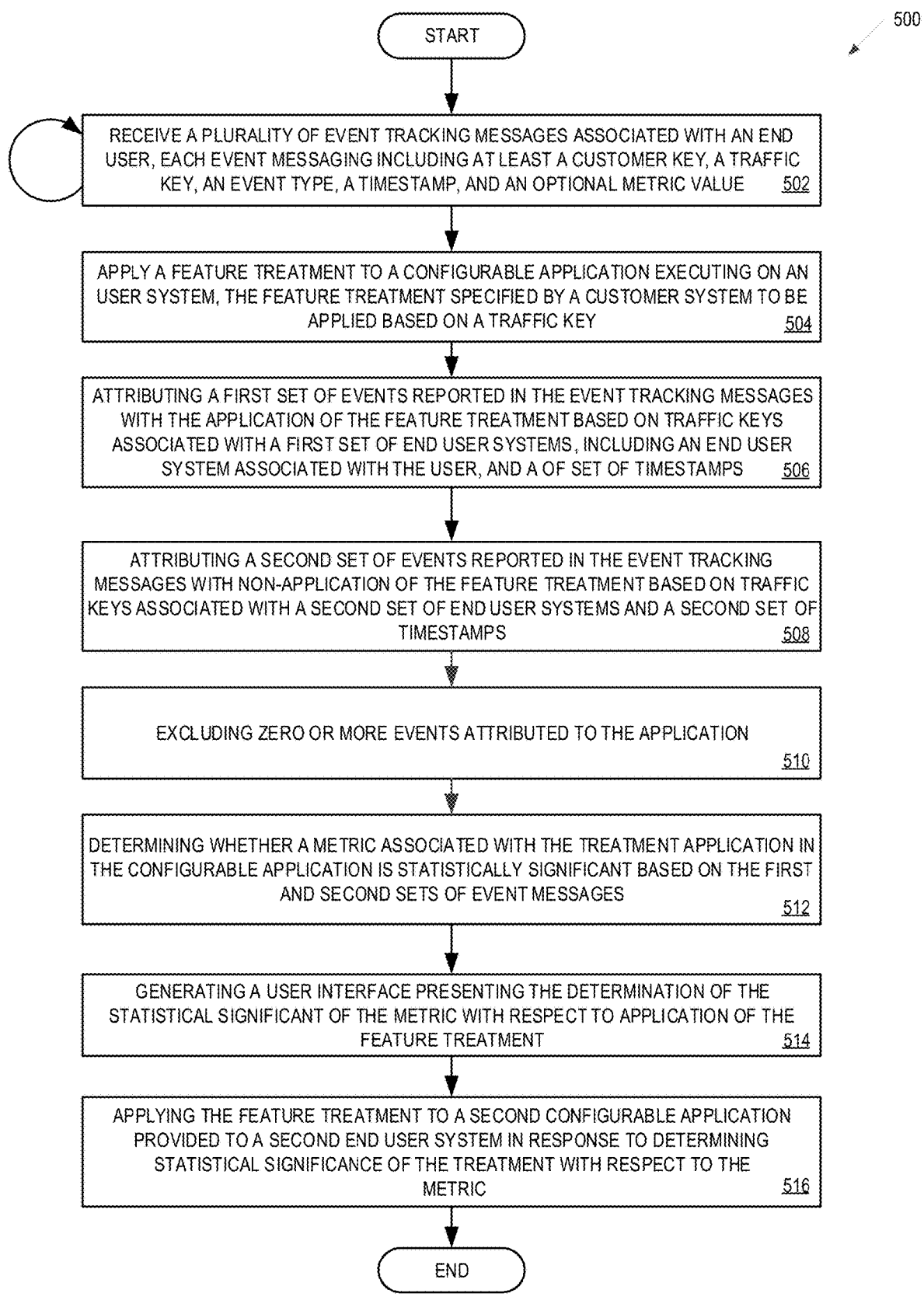
FIG. 5A is a flow diagram of one embodiment of a method for to providing attribution of events to application features.

FIG. 5A is a flow diagram of one embodiment of a method 500 for to providing attribution of events to application features. The method 500 is performed by processing logic that may comprise hardware (circuitry, dedicated logic, etc.), software (such as is run on a general purpose computer system or a dedicated machine), firmware, or a combination. In one embodiment, the method 500 is performed by an application execution management and attribution server (e.g., application execution management and attribution server 110 or 210).

Referring to FIG. 5A, processing logic begins by receiving a plurality of event tracking messages associated with an end user system, each event tracking message including at least a customer key, a traffic key (e.g., end user identifier(s), an event type, a timestamp, and an optional metric value (processing block 502). In embodiments, the messages may be from a configurable application running on the end user system, one or more remote systems, or a combination thereof. Processing logic then applies a feature treatment to a configurable application executing on the end user system, the feature treatment specified by a customer system to be applied based on traffic key. In embodiments, the traffic key is the user key discussed above (processing block 504).

Processing logic then attributes a first set of events reported in the event tracking messages with the application of the feature treatment based on traffic keys associated with a first set of end users systems, including an end user system associated with the user, and a set of timestamps (processing block 506). As discussed above, those events that are reported as occurring after a treatment is applied, and within an experiment window, are attributed to the feature treatment. Processing logic further attributes a second set of events reported in the event tracking messages with non-application of the feature treatment based on traffic keys associated with a second set of end user systems and a second set of timestamps (processing block 508). That is, events occurring on systems that do not have treatment application applied or have an alternative treatment applied may serve as a baseline for comparison against the attributed events. For example, a subset of end user systems, including an end user system associated with the user, may have the treatment applied during an experiment to determine efficacy of the treatment with respect to a customer's goal (e.g., reducing page load time, increasing occurrence of buy button selection, etc.). In this example, the other end user systems form a different subset that do not have the treatment applied (e.g., they are applying a prior version of the treatment, applying a different treatment altogether, etc.), which may be used for comparison. The efficacy (e.g., metric value being tracked) may then be analyzed, as discussed herein, to determine if a statistical significance can be detected with respect to a goal defined by a customer system.

Processing logic may further exclude one or more events attributed to the application (processing lock 510). As discussed above, a user may be excluded from an experiment and/or events excluded from an experiment for several reasons that would taint the data pool of event attribution, such as multiple rule changes and/or a treatment change during an experiment.

Processing logic determines whether a metric associated with the treatment application in the configurable application is statistically significant based on the first and second sets of event messages (processing block 512). In embodiments, processing logic may apply known statistical analysis measures. Furthermore, the metric may be defined by a customer, and may therefore be relevant to a key performance measurement associated with the configurable application (e.g., application performance, sales conversions, service bookings, new CRM contacts, etc.). Thus, processing logic can determine whether application of feature treatment influenced an end user with respect to the key performance measurement, and is therefore an effective change to the application. Additionally, the event messages are received from a plurality of remote systems that are not necessarily connected to the execution of the configurable application or the treatment itself, but nevertheless provide valuable insights into the effectiveness of the application by enabling processing logic to attribute various user actions at different systems with the feature treatment application.

Based on the analysis, processing logic generates a user interface presenting the determination of the statistical significance of the metric with respect to application of the feature treatment (processing block 514). The user interface may be a web based user interface transmitted to a customer system, and may enable the customer system to interact with the statistical analysis results of one or more experiments.

Furthermore, in embodiments, processing logic then applies the feature treatment to a second configurable application provided to a second end user system in response to determining statistical significance of the treatment with respect to the metric (processing block 516). As discussed herein, processing logic may take one or more automatic actions, based on the statistical significance indicators, to adjust configurations of the configurable applications of other users as those applications are running.

Figure 5B:
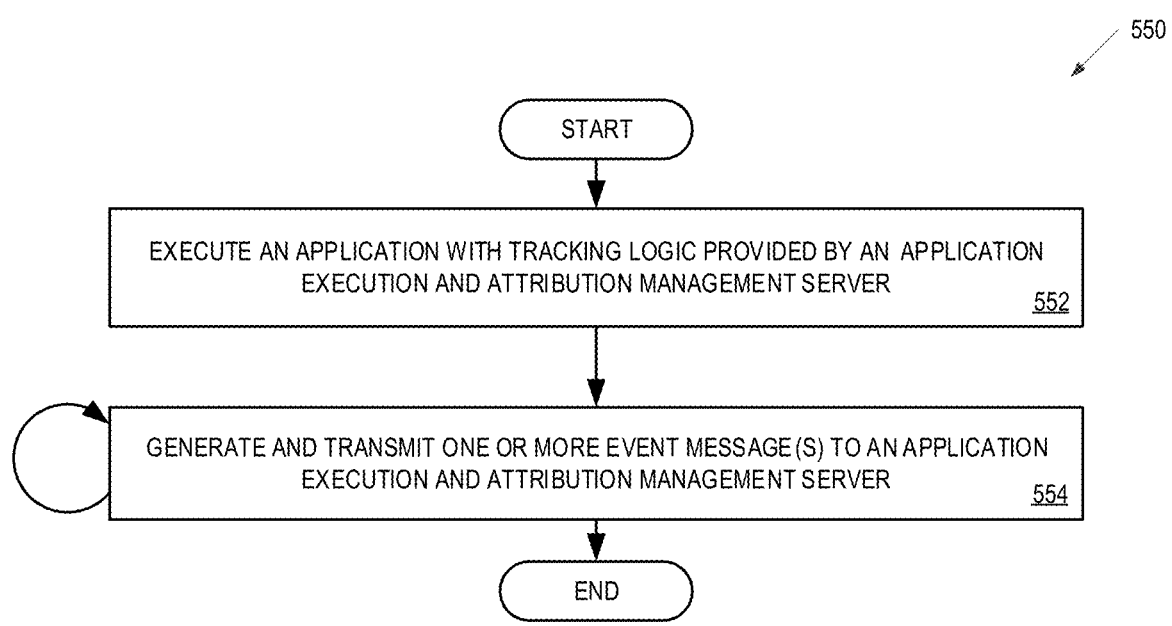
FIG. 5B is a flow diagram of one embodiment of a method for a configurable application applying a treatment and reporting impression events.

FIG. 5B is a flow diagram of one embodiment of a method 550 for an application reporting impression events. The method 550 is performed by processing logic that may comprise hardware (circuitry, dedicated logic, etc.), software (such as is run on a general purpose computer system or a dedicated machine), firmware, or a combination. In one embodiment, the method 550 may be performed by a configurable application running on a user system, such as configurable application 135-1 through 135-N and 275. In another embodiment, the method may be performed by an external customer system, such as external customer system 255. In yet another embodiment, both external customer systems and configurable applications may report impression events consistent with the discussion herein.

Referring to FIG. 5B, processing logic begins by executing an application with tracking logic provided by an application execution and attribution management server (processing block 552). For example, application execution and attribution management server 110 or 210 may provide an API, SDK, etc. to a customer system (e.g., customer system 120 or 250), which integrates tracking method calls within relevant portions of one or more software applications to be tracked. For example, the tracking calls may be integrated into application features treatments, where specific treatments are conditionally executed within the configurable application. As another example, tracking calls may be integrated into other software systems, such as membership systems, CRM systems, etc. that are relevant to a feature treatment that is the subject of an experiment. In yet another example, tracking calls may be integrated into several systems, that are part of configurable applications and external systems, where the track calls are integrated into features of relevant that are related to configurable application feature application and customer system 250 objectives In one embodiment, processing logic generates and transmits one or more event messages to an application execution and attribution management server (processing block 658). In one embodiment, event messages are generated by execute a tracking method call (e.g. track(customer_ID, traffic_ID, event-ID, metric value, and a timestamp). The date contained within the track( ) call and transmitted by processing logic to application execution and attribution management server indicates that a feature of interested within an application or external system was accessed by a user of an end user system. Then, when the data, such as customer ID, traffic/user ID, metric value, event type, timestamps, etc. are attributed to experiments based on timing, as discussed above, rich and feature full insights are gained as to whether a treatment applied to a configurable application used by one or more users (e.g., those specified in an experiment rule) is statistically significant. Then, the application execution and attribution management server may take appropriate actions, such as automatically configuring an application based on detection of statistically significant end user behaviors from the experiments.

Figure 6:
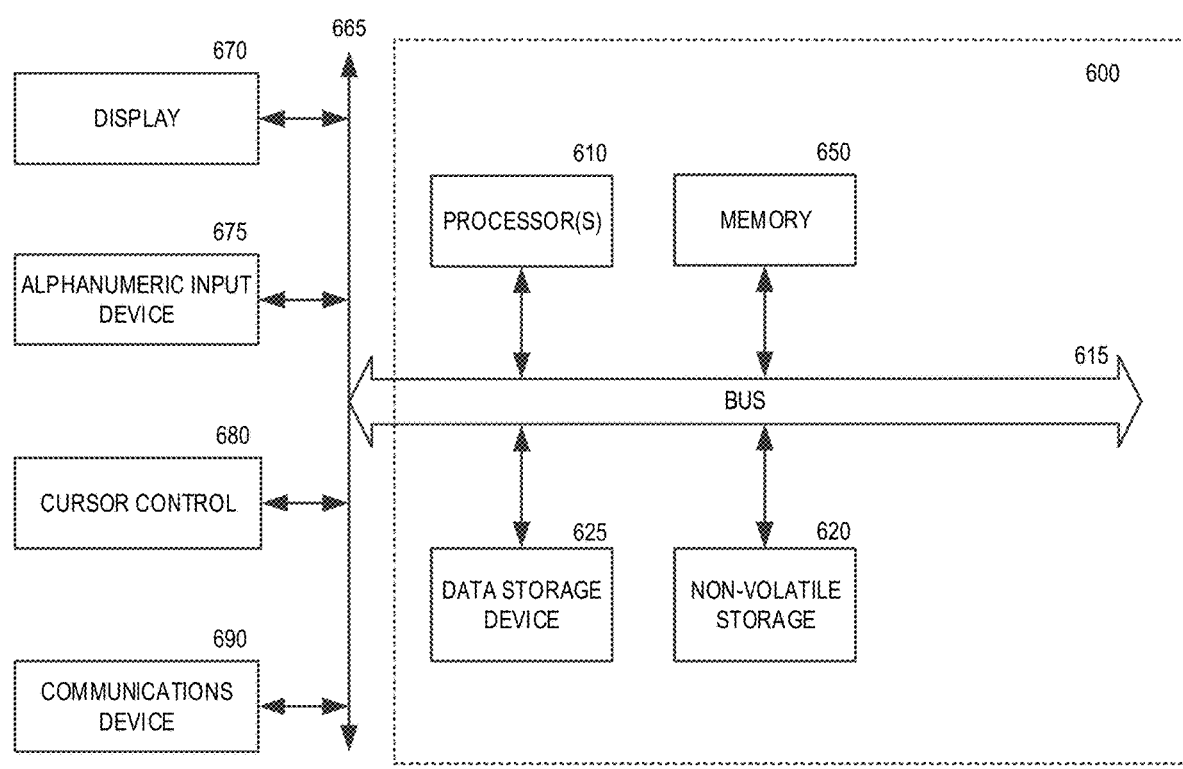
FIG. 6 is one embodiment of a computer system that may be used in accordance with an embodiment of the invention.

FIG. 6 is one embodiment of a computer system that may be used with the present invention, for example, to implement application execution and attribution management server 110. It will be apparent to those of ordinary skill in the art, however that other alternative systems of various system architectures may also be used.

The data processing system illustrated in FIG. 6 includes a bus or other internal communication means 615 for communicating information, and at least one processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED), a liquid crystal display (LCD), or other display, coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a non-transitory computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method for event attribution during software experimentation, comprising:

receiving, by a server computer system, a plurality of event tracking messages associated with an end user system, each event tracking message including at least a customer identifier, an end user identifier, and a timestamp;

storing each event tracking messages with the received customer identifier, end user identifier, and timestamp in a customer data store;

applying, by the server computer system, a feature treatment to a configurable application executing on the end user system, the feature treatment specified by a customer system associated with the customer identifier, and the feature treatment configures one or more features of the configurable application associated with the end user identifier;

attributing a first set of events from the received plurality of event tracking messages with the application of the feature treatment based on the end user identifier and timestamps from the first set of events indicating the associated events occurred after the application of the feature treatment to the configurable application;

receiving, by the server computer system from a customer computer system, a definition of an experiment where the definition of the experiment defines application of the feature treatment from a start time for a specified duration of time, and further defines a plurality of end users including the end user system identified by the end user identifier, and wherein receiving the definition of the experiment comprises in response to receiving a rule that specifies an end user attribute that is to be targeted by application of the feature treatment for the experiment, the server computer system selecting the plurality of end users based the specified end user attribute in the rule;

applying, by the server computer system, the feature treatment to a plurality of configurable applications executing on a plurality of end user systems associated with the plurality of end users during a duration of the experiment; and attributing events received from event tracking messages generated by the plurality of configurable applications during the duration of the experiment with the application of the feature treatment, further comprising excluding event tracking messages associated with the end user system from attribution by the server computer system in response to one or more of (i) a determination that the configurable application executed by the end user system applied two or more treatments during the experiment without a change in the rule, and (ii) a determination that two or more rule changes impact treatments applied to the configurable application executed by the end user system during the experiment.

2. The method of claim 1, further comprising:

determining, by the server computer system, whether there is a statistical significance of the first set of events being caused by the application of the feature treatment to the configurable application, wherein the determination of the statistical significance is based on the attribution of the first set of events to the application of the feature treatment and a second set of events generated by a second set of end user systems that are attributed to non-application of the feature treatment to the configurable application at the second set of end user systems.

3. The method of claim 2, wherein each of the received plurality of event tracking messages associated with the end user system further comprise an event type identifier and a value for a metric being measured for the event type, and wherein the determination of the statistical significance is further based on a first set of values for the metric from event tracking messages received after application of the feature treatment and a second set of values for the metric associated with non-application of the feature treatment received from the second set of end user systems.

4. The method of claim of claim 3, wherein each event tracking message is generated by a tracking method call embedded in feature treatments that have been activated in the configurable application being executed at the end user system, wherein the tracking method call comprises the customer identifier, end user identifier, event type identifier, value for the metric, and the timestamp as arguments in the executed tracking method call.

5. The method of claim 2, further comprising:

in response to determining, by the server computer system, that there is a statistical significance of the first set of events being caused by the application of the feature treatment to the configurable application, the server computer system automatically applying the feature treatment determined to have statistical significance to a second end user system.

6. The method of claim 1, wherein a set of the plurality of event tracking messages are generated by a software application executed by a system other than the end user system, and wherein the server computer system attributes events identified by the event messages from the set to the application of the feature treatment to the configurable application executing on the end user system based on the customer identifier, end user identifier, and timestamp in each message in the set of event tracking messages, and wherein the timestamp in each message in the set of event tracking messages is determined to be after a time when the feature treatment was applied to the configurable application at the end user system.

7. A non-transitory computer readable storage medium including instructions that, when executed by a processor, cause the processor to perform operations for event attribution during software experimentation, the operations comprising:
- receiving, by a server computer system, a plurality of event tracking messages associated with an end user system, each event tracking message including at least a customer identifier, an end user identifier, and a timestamp;
- storing each event tracking messages with the received customer identifier, end user identifier, and timestamp in a customer data store;
- applying, by the server computer system, a feature treatment to a configurable application executing on the end user system, the feature treatment specified by a customer system associated with the customer identifier, and the feature treatment configures one or more features of the configurable application associated with the end user identifier;
- attributing a first set of events from the received plurality of event tracking messages with the application of the feature treatment based on the end user identifier and timestamps from the first set of events indicating the associated events occurred after the application of the feature treatment to the configurable application;
- receiving, by the server computer system from a customer computer system, a definition of an experiment where the definition of the experiment defines application of the feature treatment from a start time for a specified duration of time, and further defines a plurality of end users including the end user system identified by the end user identifier, and wherein receiving the definition of the experiment comprises in response to receiving a rule that specifies an end user attribute that is to be targeted by application of the feature treatment for the experiment, the server computer system selecting the plurality of end users based the specified end user attribute in the rule;
- applying, by the server computer system, the feature treatment to a plurality of configurable applications executing on a plurality of end user systems associated with the plurality of end users during a duration of the experiment; and
- attributing events received from event tracking messages generated by the plurality of configurable applications during the duration of the experiment with the application of the feature treatment, further comprising excluding event tracking messages associated with the end user system from attribution by the server computer system in response to one or more of (i) a determination that the configurable application executed by the end user system applied two or more treatments during the experiment without a change in the rule, and (ii) a determination that two or more rule changes impact treatments applied to the configurable application executed by the end user system during the experiment.

8. The non-transitory computer readable storage medium of claim 7, further comprising:
- determining, by the server computer system, whether there is a statistical significance of the first set of events being caused by the application of the feature treatment to the configurable application, wherein the determination of the statistical significance is based on the attribution of the first set of events to the application of the feature treatment and a second set of events generated by a second set of end user systems that are attributed to non-application of the feature treatment to the configurable application at the second set of end user systems.

9. The non-transitory computer readable storage medium of claim 8, wherein each of the received plurality of event tracking messages associated with the end user system further comprise an event type identifier and a value for a metric being measured for the event type, and wherein the determination of the statistical significance is further based on a first set of values for the metric from event tracking messages received after application of the feature treatment and a second set of values for the metric associated with non-application of the feature treatment received from the second set of end user systems.

10. The non-transitory computer readable storage medium of claim of claim 9, wherein each event tracking message is generated by a tracking method call embedded in feature treatments that have been activated in the configurable application being executed at the end user system, wherein the tracking method call comprises the customer identifier, end user identifier, event type identifier, value for the metric, and the timestamp as arguments in the executed tracking method call.

11. The non-transitory computer readable storage medium of claim 8, further comprising:
- in response to determining, by the server computer system, that there is a statistical significance of the first set of events being caused by the application of the feature treatment to the configurable application, the server computer system automatically applying the feature treatment determined to have statistical significance to a second end user system.

12. The non-transitory computer readable storage medium of claim 7, wherein a set of the plurality of event tracking messages are generated by a software application executed by a system other than the end user system, and wherein the server computer system attributes events identified by the event messages from the set to the application of the feature treatment to the configurable application executing on the end user system based on the customer identifier, end user identifier, and timestamp in each message in the set of event tracking messages, and wherein the timestamp in each message in the set of event tracking messages is determined to be after a time when the feature treatment was applied to the configurable application at the end user system.

13. A system for event attribution during software experimentation, comprising:
- a memory to store event tracking messages; and
- a processing system coupled with the memory configured to:
  - receive a plurality of event tracking messages associated with an end user system, each event tracking message including at least a customer identifier, an end user identifier, and a timestamp,
  - store each event tracking messages with the received customer identifier, end user identifier, and timestamp in a customer data store maintained in the memory,
  - apply a feature treatment to a configurable application executing on the end user system, the feature treatment specified by a customer system associated with the customer identifier, and the feature treatment configures one or more features of the configurable application associated with the end user identifier, attribute a first set of events from the received plurality of event tracking messages with the application of the feature treatment based on the end user identifier and timestamps from the first set of events indicating the associated events occurred after the application of the feature treatment to the configurable application;

receive, from a customer computer system, a definition of an experiment, where the definition of the experiment defines application of the feature treatment from a start time for a specified duration of time, and further defines a plurality of end users including the end user system identified by the end user identifier, and wherein receiving the definition of the experiment comprises in response to receipt of a rule that specifies an end user attribute that is to be targeted by application of the feature treatment for the experiment, the processing system configured to select the plurality of end users based the specified end user attribute in the rule;

apply the feature treatment to a plurality of configurable applications executing on a plurality of end user systems associated with the plurality of end users during a duration of the experiment, and attribute events received from event tracking messages generated by the plurality of configurable applications during the duration of the experiment with the application of the feature treatment, further comprising the processing system configured to exclude event tracking messages associated with the end user system from attribution by the server computer system in response to one or more of (i) a determination that the configurable application executed by the end user system applied two or more treatments during the experiment without a change in the rule, and (ii) a determination that two or more rule changes impact treatments applied to the configurable application executed by the end user system during the experiment.

14. The system of claim 13, wherein the processing system if further configured to:

determine whether there is a statistical significance of the first set of events being caused by the application of the feature treatment to the configurable application, wherein the determination of the statistical significance is based on the attribution of the first set of events to the application of the feature treatment and a second set of events generated by a second set of end user systems that are attributed to non-application of the feature treatment to the configurable application at the second set of end user systems.

15. The system of claim 14, wherein the processing system if further configured to:

in response to determination that there is a statistical significance of the first set of events being caused by the application of the feature treatment to the configurable application, the processing system configured to automatically apply the feature treatment determined to have statistical significance to a second end user system.

* * * * *